United States Patent [19]
Yoshikawa

[11] Patent Number: 4,953,042
[45] Date of Patent: Aug. 28, 1990

[54] CASSETTE LOADING APPARATUS

[75] Inventor: Kikuo Yoshikawa, Kanagawa, Japan

[73] Assignee: Canon Kabushiki Kaisha, Tokyo, Japan

[21] Appl. No.: 186,954

[22] Filed: Apr. 27, 1988

[30] Foreign Application Priority Data

Apr. 30, 1987 [JP] Japan .............................. 62-109406
Apr. 30, 1987 [JP] Japan .............................. 62-109407

[51] Int. Cl.$^5$ .......................................... G11B 17/04
[52] U.S. Cl. ............................. 360/96.5; 360/99.02; 360/99.06
[58] Field of Search ............... 360/96.5, 96.6, 99.02, 360/99.06

[56] References Cited

U.S. PATENT DOCUMENTS 4,622,606 11/1986 Rudi .................................. 360/96.5
4,683,506 7/1987 Toldi et al. ...................... 360/99.06
4,763,212 8/1988 Kanno et al. ................... 360/99.06

FOREIGN PATENT DOCUMENTS 2127205 4/1984 United Kingdom ............. 360/99.02

Primary Examiner—John H. Wolff
Attorney, Agent, or Firm—Robin, Blecker, Daley & Driscoll

[57] ABSTRACT

A cassette loading apparatus for loading a cassette containing a recording medium such as a disc, a tape, and the like to a predetermined loading position in the driving device comprises a cassette holder movable between a first position of the cassette being attachable and detachable from an opening for inserting the cassette and a second position for loading the cassette to a predetermined loading position, a lid attached to be opened and closed freely to the opening for inserting the cassette, a control lever for ejecting the cassette holder from the second position to the first position or loading from the first position to the second position in association with opening and closing actions of the lid, and a lock mechanism for locking the lid in its position by closing it and releasing the lock by pressing the lid again. And loading and ejecting actions of the cassette can be selectively performed only by opening and closing actions of the lid.

24 Claims, 8 Drawing Sheets

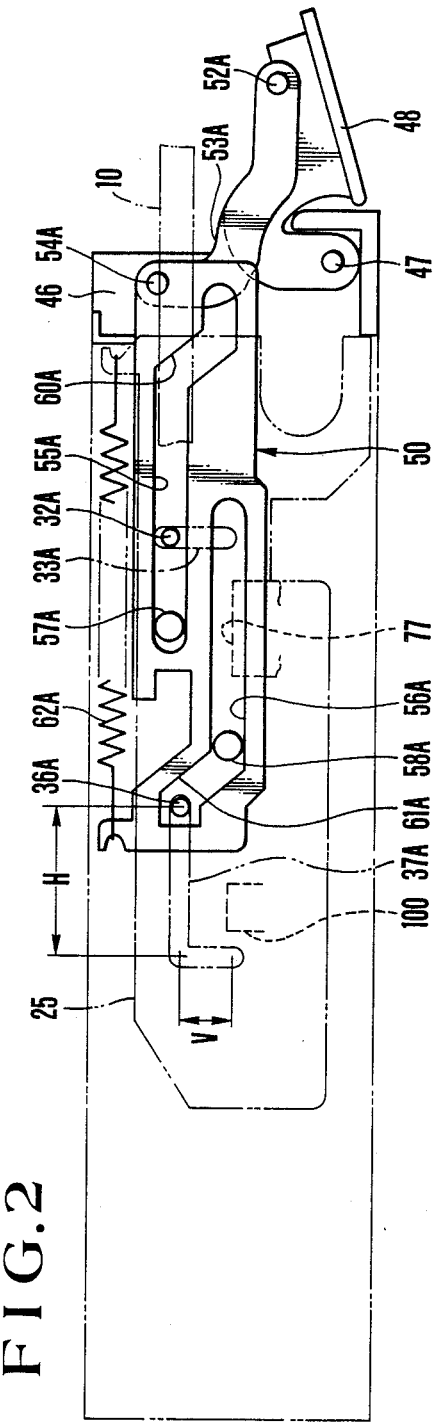
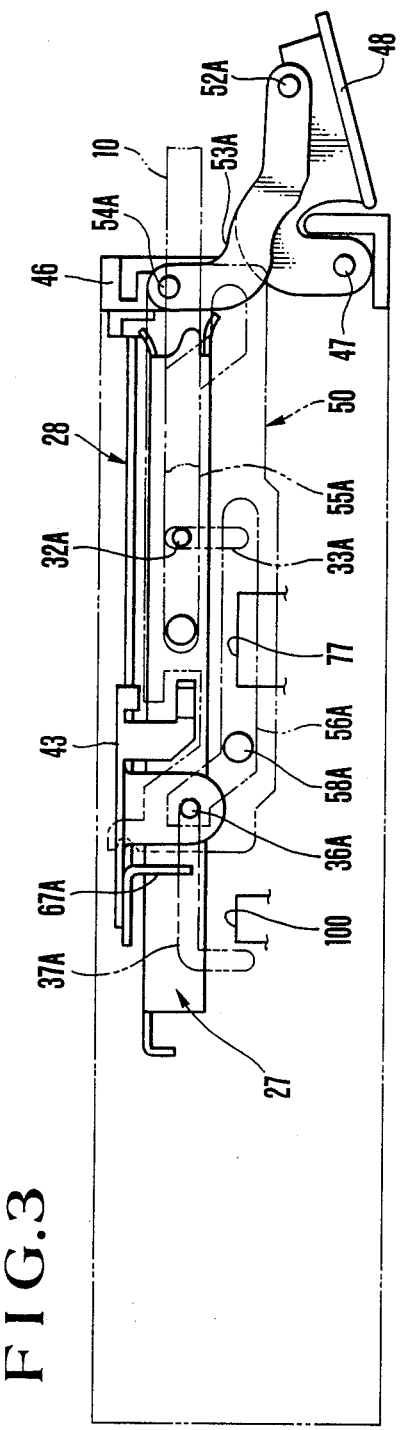

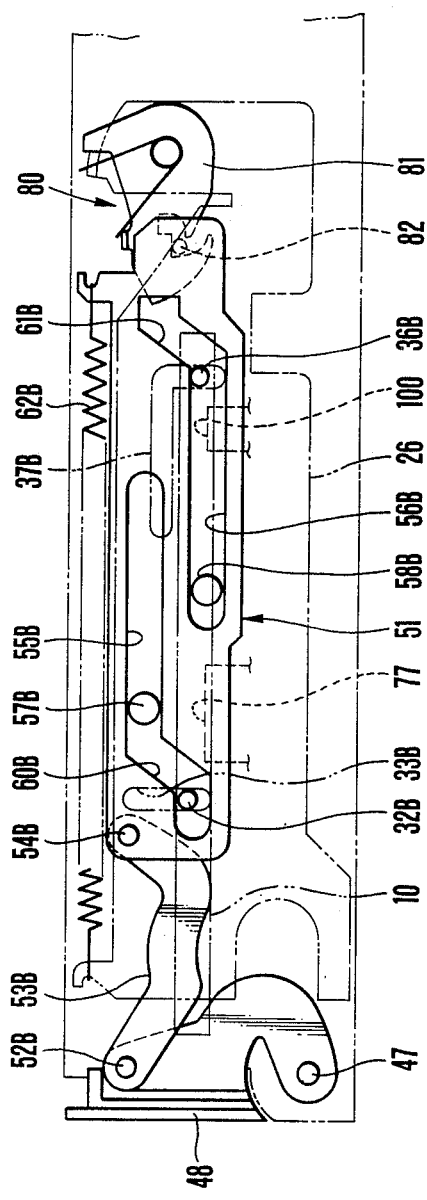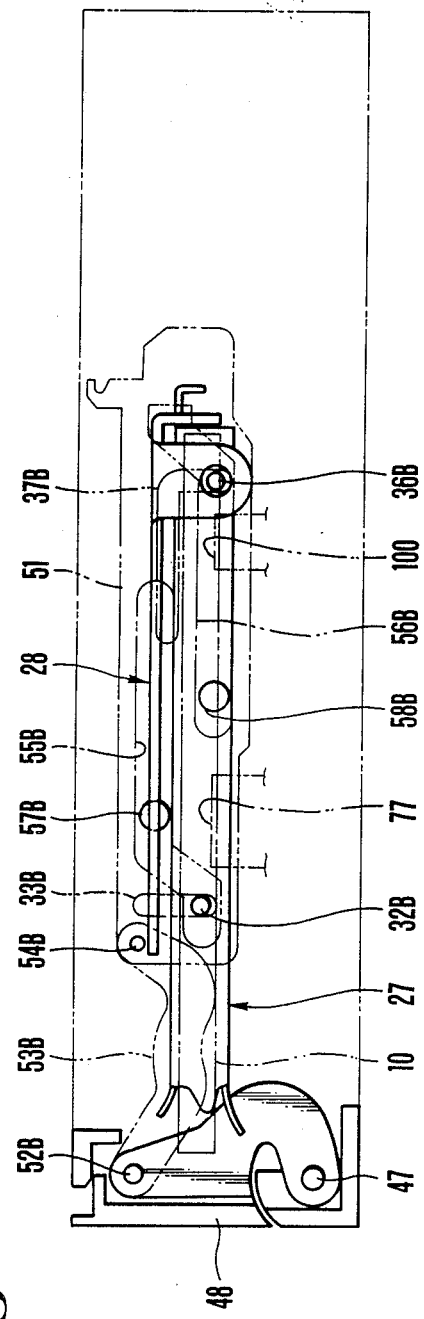

CASSETTE LOADING APPARATUS

BACKGROUND OF THE INVENTION

1. Field of the Invention:

The present invention relates to a cassette loading apparatus for loading a cassette containing a recording medium such as a disc or a tape, etc. to a predetermined loading position in a drive unit.

2. Description of the Related Art:

Conventionally, in a computer, a wordprocessor or audio equipment, a floppy disc or magnetic tape which is contained in a cassette case is generally used as recording (sound recording) and reproducing media. In the equipment, a cassette loading apparatus is installed to insert a cassette into a loading position arranged opposite to a head.

In the cassette loading apparatus, there are two types for loading a cassette, that is, to load automatically by driving a motor through detecting the cassette insertion or switch operation, and to set manually through mechanical actions.

The present invention relates to a structure of a cassette loading apparatus in the latter manual operations.

The cassette loading apparatus is, generally, composed for chucking the cassette which is inserted for a certain distance from an open portion by a cassette holding member to further move and lock the cassette holding member to a cassette loading position, and for sending back the cassette holding member to an ejection position (in the proximity of the chucking position) to be easily taken out after releasing the lock when taking out the cassette.

In a conventional cassette loading apparatus, users used to operate a certain lever or button for start-up. But in such a conventional structure, a lever or button installed in the surrounding of the open portion for inserting a cassette protrudes from the surface of the front panel, thus causing erroneous operations as well as design restrictions. And it is difficult to improve the design by making the structure flat-nosed. Necessity of installing an individual mechanism for an ejection button, an ejection lever, etc. makes the structure rather complicated. There are also some problems attending the need for extra spaces of installation and package for the protruding portion.

SUMMARY OF THE INVENTION

The object of the present invention, which is made in consideration of the problems of the conventional technique, is to attain design improvement and effectiveness of space reductions by fully making the flat panel flat-nosed and to offer a cassette loading apparatus capable of improving operability of inserting and taking out the cassette.

Under the foregoing object, one of the preferred embodiments of the present invention is a cassette loading apparatus, comprising a cassette holder for transferring a cassette inserted from an open portion for inserting the cassette to a predetermined loading position in the apparatus, a lid attached to the open portion for opening and closing freely, control means for transferring the cassette holder between the cassette loading position and the cassette insertable or ejectable position by interlocking of the opening and closing actions of the lid, and locking means for closing the lid by closing actions thereof, that is, locking the cassette holder in the loading position, releasing the lock by further pressing the lid in the direction of closing in the lock state and opening the lid for allowing the cassette holder to be shiftable to the cassette ejection position. That is to say, a cassette loading apparatus is disclosed, wherein it is capable of doing loading and unloading actions of the cassette and locking and unlocking at each position only by opening and closing actions of the lid to omit an ejection button and the like by taking in and locking the cassette in the loading position through closing actions of the lid, and releasing and transferring the cassette to the ejection position by pressing actions of the lid again, and closing a cassette insertion opening with the lid in a cassette loaded state and preventing dust from intruding. Under the foregoing object, one of the preferred embodiments of the present invention is disclosed as a cassette loading apparatus for improving operability and simplifying structures by doing loading and unloading actions of a cassette through opening and closing actions of the lid for closing the open portion of the cassette insertion in an apparatus capable of inserting the cassette horizontally through the open portion for inserting the cassette formed on the front face of the body, which composes the first position capable of receiving or ejecting the cassette horizontally inserted through the open portion for inserting the cassette, a cassette holder for transferring the cassette received at the first position to a predetermined loading position, a lid attached to be opened and closed freely at the open portion for inserting the cassette, and control means for transferring the cassette holder to each position for ejecting and loading the cassette in interlocking actions with opening and closing actions of the lid.

Other objects and advantages of the present invention will be made apparent in the following drawings and the description on the specification.

BRIEF DESCRIPTION OF THE DRAWINGS

FIG. 2 is a side view taken along line II—II of FIG. 1 with parts broken away for clarity.

FIG. 3 is a side view taken along line II—II of FIG. 1 with other parts broken away for clarity.

FIG. 4 is a side view taken along line IV—IV of FIG. 1 with parts broken away for clarity.

FIG. 5 is a side view taken along line IV—IV of FIG. 1 with other parts broken away for clarity.

DETAILED DESCRIPTION OF THE PREFERRED EMBODIMENTS

Figure 1:
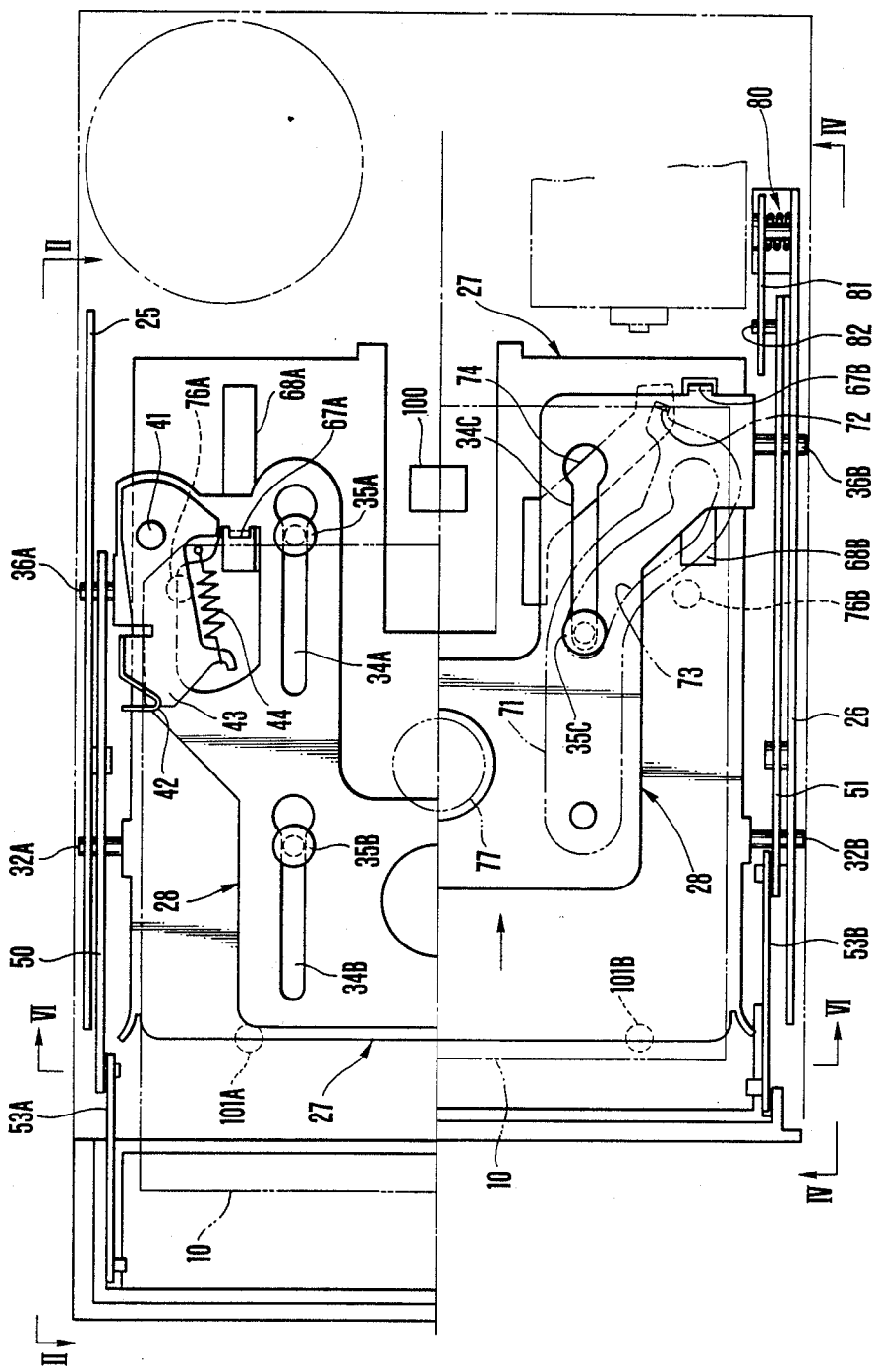
FIG. 1 is a plan view showing the main portions of the cassette loading apparatus of which the upper half portion is in the ejection position and the lower half portion is in the loading position in accordance with the present invention.

The preferred embodiments of the present invention for a cassette loading device when applied to an apparatus using a floppy disc cassette will be described in detail referring to the drawings.

Figures 13A, 13B:
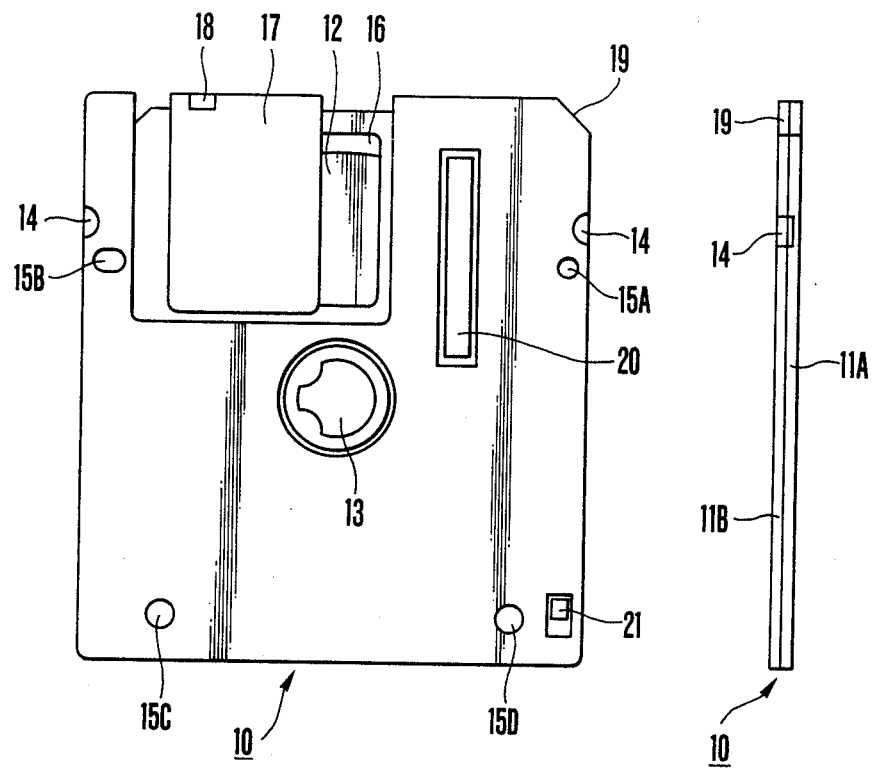
FIG. 13(A) is a bottom end view of a cassette used in a cassette loading apparatus of FIG. 1.
FIG. 13(B) is a side view of the cassette.
Figure 14:
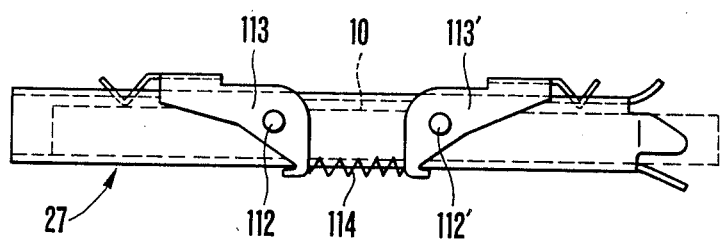
FIG. 14 is a side view showing a means for positioning a cassette in another embodiment.

FIGS. 13(A) and 13(B) show respectively, a reverse side (bottom end) view and a side view of a floppy disc cassette 10 preferrable as a cassette which is set on the cassette loading apparatus in accordance with the present invention. In FIGS. 13(A) and 13(B), a floppy disc 12 is contained and pivotally supported within a case composed of upper and lower cassette shells 11A and 11B. A hub (disc hub) 13 of the floppy disc 12 is movably supported in the center of the cassette. Furthermore, and end face of the hub 13 is formed at least by magnetic materials. Positioning is set by pressing the end face against a magnetic supporting face of a drive shaft movably supported at the cassette loading portion.

On both ends of the reverse face of the cassette 10, concave portions (notch portions) 14 are formed for engaging a cassette holding claw of a chuck link as chucking means which will be described later.

On a reverse face of the cassette 10, positioning holes 15A, 15B, 15C and 15D in which positioning pins installed on the base of the cassette loading portion are provided to exactly determine the position of the cassette 10. On the reverse side of the cassette shell 11B, an opening 16 is formed to expose the inside disc 12 at an opposing portion to a head installed on the apparatus side in a loading completion state (usually installed on two faces of the surface and the reverse sides). The opening 16 is opened and closed by moving a slidably installed shutter 17 to the right and left. The shutter 17 is always urged to move to the direction of closing by a known torsion coil spring which is not shown and the like to be opened by interlocking retracting actions when the cassette is loaded.

A concave portion (notch portion) 18 is formed on the shutter 17 to engage an engaging projection of shutter opener which will be described.

Furthermore, FIG. 13(A) shows the condition that the shutter 17 is in the middle position between the closing and the opening positions.

On the left side of the end of the cassette 10 (on the right side in a reverse face view of FIG. 13(A), a slant face (sliding face) 19 is formed as a configuration to prevent erroneous insertions.

In addition, on the reverse side of the cassette 10 shown in the figure, a stabilizer 20 is installed to clip the disc 12 in the cassette 10 and to exert predetermined pressure thereon by being abutted with springs from upper and lower sides at the loading position.

Moreover, on the corner portion of the cassette 10, a write protector 21 is installed for preventing wrong erasure.

Now, the mechanism to load the aforementioned cassette 10 into the apparatus body will be explained.

In FIGS. 1-6, the cassette loading apparatus has a left side plate 25 and a right side plate 26 fixed on the machine frame of the drive unit, and thereby are supported a cassette holder 27 guided up and downwardly by side plates 25 and 26 on the left and right sides, and a slide member (cassette holding member) 28 guided forward and backward, and up and downwardly.

Figure 6:
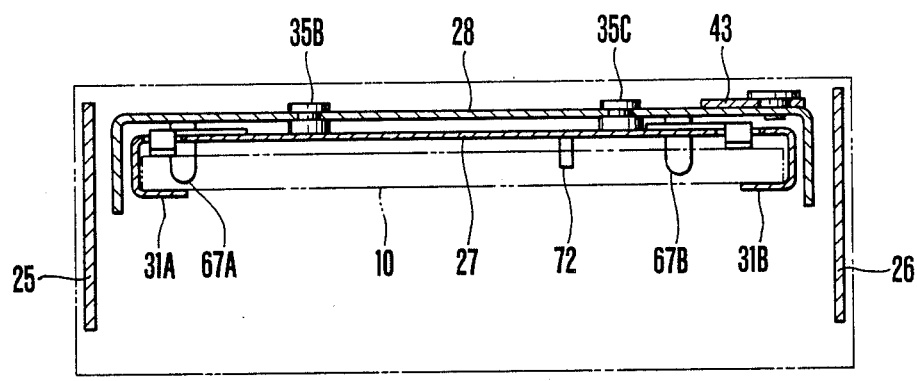
FIG. 6 is a sectional view taken along line VI—VI of FIG. 1.

As shown in FIG. 6, the cassette holder 27 has on the right and left sides of the underside fragmental configurations of guide portions 31A and 31B for slidably guiding the underside of the inserted cassette 10 in the forward and backward directions, and storing and holding thereof. The slide member 28 is slidably supported in the forward and backward directions to the cassette holder 27.

Firstly, the cassette holder 27 is movably attached up and downwardly by fitting engaging pins 32A and 32B installed on both sides respectively to vertical guide grooves 33A and 33B formed on the side plates 25 an 26 on both sides.

The slide member 28, as shown in FIG. 1 especially, is slidably attached in the forward and backward directions against the cassette holder 27 by engaging long grooves (guide grooves) 34A, 34B and 34C in the forward and backward directions respectively formed in three places with engaging pins 35A, 35B, and 35C planted on the cassette holder 27.

Moreover, the slide member 28 is movably assembled in the forward and backward directions and up and downward directions by respectively engaging engaging pins 36A and 36B installed on both sides thereof with refracted guide grooves formed on side plates 25 and 26 on the both sides, that is, guide grooves 37A and 37B having horizontal and vertical portions. A chuck link 43 having a cassette holding claw 42 for hooking on the concave portion 14 for chucking of the inserted cassette 10 is axially supported at an axial supporting point 41 installed on the slide member 28. The chuck link 43 is urged to move in the counterclockwise direction in FIG. 1 by a spring 44 extended to the slide member 28.

When the cassette 10 is inserted and the slant face 19 of the cassette 10 runs against the cassette holding claw 42 of the chuck link 43, the cassette holding claw 42 is pushed outwardly by the slant face 19, the chuck link 43 is rotated in the clockwise direction and the cassette holding claw 42 slides in the state of running into the side of the cassette 10.

When the cassette 10 is further pushed to come to chucking position (or ejection position), the cassette holding claw 42 is pushed into the concave portion 14 of the cassette 10 by the force of the spring 44. And the cassette 10 is chucked by pressing engagement of the chuck link 43 urged to move by the spring 44 and is held to be transferred in the forward and backward directions in conjunction with the slide member 28.

When the cassette 10 is erroneously inserted and the slant face 19 is not opposite to the side of the chuck link 43, an opposing face of the cassette 10 runs against the chuck link 43 to be stopped and further insertion into the inside is impossible. Thus, a false insertion preventive mechanism for the cassette is composed.

Figure 9:
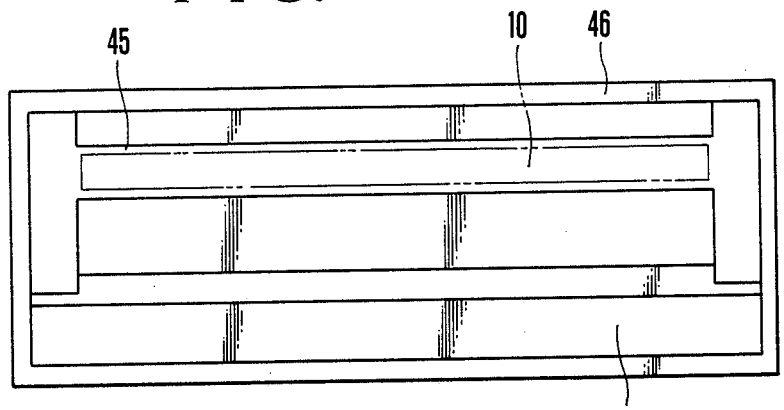
FIG. 9 is a front view showing an open portion for inserting the cassette of a cassette loading apparatus of FIG. 1.

FIG. 9 is a front view of the cassette loading apparatus.

Front panel 46 having an open portion 45 for inserting a cassette is installed on a front face of the cassette loading apparatus. The open portion 45, as is clarified by the side view of FIG. 2, is opened and closed by the door 48 revolving around an axial supporting point 47.

On the other hand, on both sides of the cassette loading apparatus, that is, on both sides of the fixed side plates 25 and 26, are attached loading plates 50 and 51 on both sides which are transferrable in the forward and backward directions in conformity with opening and closing actions of the door 48. One ends of door links 53A and 53B are rotatably connected to each of pivots 52A and 52B installed on both sides of the door 48. The other ends of the door links 53A and 53B are rotatably connected respectively to front end portions of the loading plates 50 and 51 on both sides through the pivots 54A and 54B. Two pieces of guide grooves 55A and 55B and 56A and 56B are formed on the loading plates 50 and 51 on both sides. The loading plates 50 and 51 are slidably supported forward and backward by engaging respectively each guide groove 55A, 55B, 56A and 56B with engaging pins 57A, 57B, 58A and 58B planted on the side plates (fixed) 25 and 26 on both sides Furthermore, the guide grooves 55A, 55B and 56A, 56B are respectively formed symmetrically. Horizontal portions of the guide grooves are formed to guide each of the loading plates 50 and 51 in the horizontal direction against the side plates 25 and 26. At the same time, on the end portion of each guide groove are formed engaging cam portions 60A, 60B, 61A and 61B as a slant groove. The engaging cam portions 60A, 60B and 61A, 61B slidably engage engaging pins 32A, 32B on both sides of the cassette holder 27 and engaging pins 36A, 36B on both sides of the slide member 28, to guide the cassette holder 27 upward and downward by forward and backward movement of the loading plates 50 and 51 and also to guide the slide member 28 forward and backward against the cassette holder 27 and that upward and downward with the cassette holder 27.

The loading plates 50 and 51 on both sides are always urged to move to the return direction by extension springs 62A and 62B extensibly installed between the side plates 25 and 26 on both sides, and the door 48 is also urged to move in the direction of opening. Thus, when the door 48 is moved from the opening position of FIGS. 2 and 3 to the closing position of FIGS. 4 and 5, that is, the slide member 28 by which the cassette 10 is chucked, is retracted inwardly for the distance H (FIG. 2), both the slide member 28 and the cassette holder 27 are lowered downwardly as far as the height V to set to a predetermined loading position in this structure. At the loading position, the cassette 10 is positioned by positioning pins 76A, 76B, 101A, 101B, etc. on the base 75, and a head 100 is inserted from the opening 16 to abut against the disc 12 for allowing recording and reproducing. This movement is performed exactly in conformity with the steps of closing movements of the door 48 by mechanically guiding engaging pins 32A, 36A, 32B and 36B at cam engaging portions 60A, 61A, 60B and 61B formed on the loading plates 50 and 51.

Furthermore, the door 48 and the loading plates 50 and 51 operate a lock and release mechanism which will be described later, and therefore, an overstroke is installed on the guide grooves 55A and 55B for allowing further movement than that required for the distance to the closing position of the door 48 or the loading position of the cassette holder 27.

It should be noted that the above cassette loading operation is not effected by an elastic force of the spring, but is effected completely without any impact.

Figure 8:
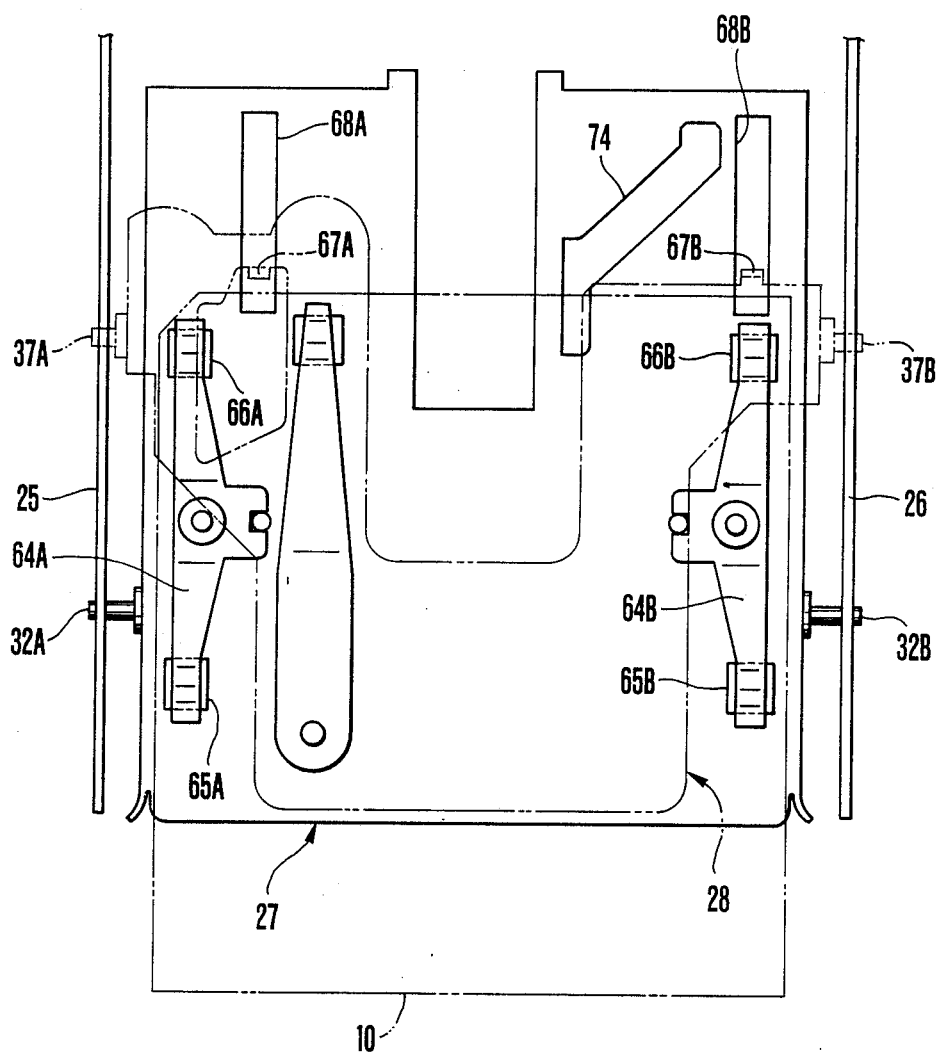
FIG. 8 is a plan view of the cassette holder of FIG. 1.

FIG. 8 shows an upper surface of the cassette holder 27. In FIG. 8, leaf springs 64A and 64B are mounted on the right and left sides of the upper surface of the cassette holder 27 to press the cassette 10. Both end portions of the leaf springs 64A and 64B are protruded downwardly from the openings 65A, 66A, 65B and 66B formed on the cassette holder 27, pressing against the upper surface of the cassette 10 inserted into the cassette holder 27, and holding the cassette 10 in no backlash state by pressing it against the guide portions 31A and 31B (FIG. 6) on the lower surface of the cassette holder 27.

On the slide member 28, as described above, the chuck link 43 for chucking the cassette 10 is installed through the axial supporting point 41. The slide member 28 functions also as a cassette holder member.

Stoppers 67A and 67B (FIG. 1 and FIG. 6) are installed to the slide member 28 to prevent excessive intrusions in such a condition that the cassette holding claw 42 (FIG. 1) is pressed to engage with the concave portion 14 of the cassette 10 (FIG. 13) by the spring 44, that is, the cassette 10 is chucked. The stoppers 67A and 67B are formed into unified projection bent downward from the slide member 28. In an example shown in the figure, the stoppers 67A and 67B are structured to protrude downward through long holes 68A and 68B in the forward and backward directions formed on the cassette holder 27 without any hindrance to retracting actions of the cassette 10.

Figure 10:
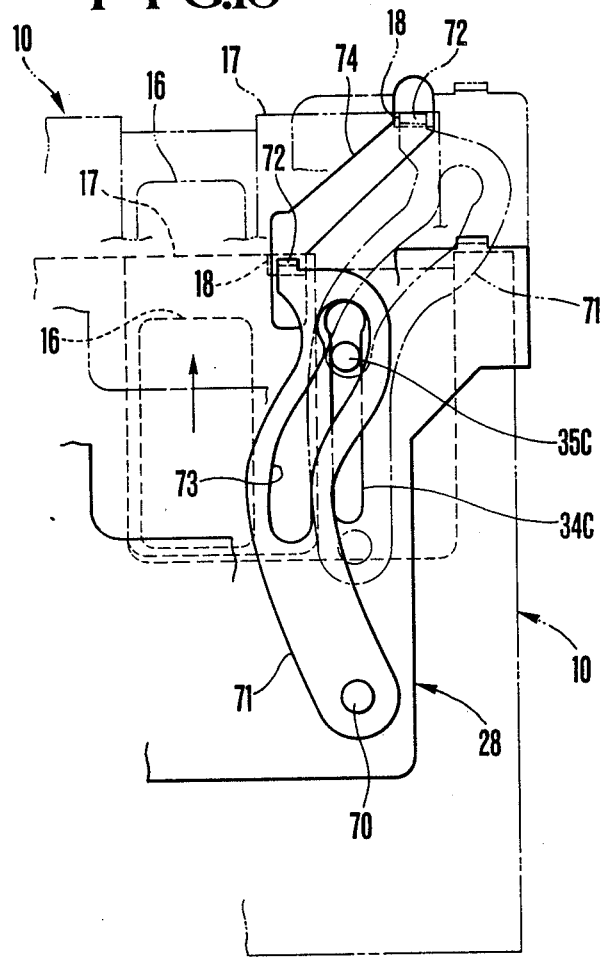
FIG. 10 is a partial plan view showing mechanism and operations for opening and closing a shutter of the cassette loading apparatus of FIG. 1.

FIG. 10 is a partial plan view showing a mechanism and operations to open and close the shutter 17 (FIG. 13) for closing the open portion 16 of the cassette 10 in accordance with inserting operations of the cassette 10.

In FIG. 1 and FIG. 10, as described above, the guide groove 34C in a form of a long hole in the forward and backward directions formed on the slide member 28 engages the engaging pin 35C planted on the cassette holder 27 and the slide member 28 moves relatively in the forward and backward directions against the cassette holder 27.

Moreover, a shutter opener 71 is axially supported rotatably to the slide member 28 through an axial supporting point 70. On the end portion of the shutter opener 71, an engaging projection 72 engaging the concave portion 18 of the shutter 17 which opens and closes the open portion 16 of the chucked cassette 10 is formed into unified body. A cam groove 73 which always engages the engaging pin 35C planted on the cassette holder 27 is formed in the shutter opener 71.

The shutter opener 71 and the cam groove 73 are formed to move the engaging projection 72 of the shutter opener 71 to the direction of shutter opening (from left to right) against the slide member 28 (therefore against the cassette 10) in accordance with the movement when the slide member 28 which is chucking the cassette 10 moves backward, that is, when the cassette 10 is retracted. And the position of a rotation supporting point 70 is predetermined.

On the upper surface of the cassette holder 27, an opening 74 is also formed to evade the movement of the engaging projection 72 of the shutter opener 71 in the directions of the shutter opening and closing.

In FIG. 10, a solid line and a chain line show the position of chucking (ejection position) and a two-dot chain line shows the loading position with the cassette retracted.

Thus, a mechanism to open and close the open portion 16 is composed for moving the shutter 17 in conjunction with pressing into (retracting) and ejecting of the cassette 10 by forming the cam means 35C, 71 and 73 to change the movement of the chucked cassette 10 into the movement of the cassette in the opening and closing directions of the shutter (from left to right) and the claw portion (engaging projection) 72 which engages the concave portion 18 of the shutter 17 on the moving portion in the direction of shutter opening and closing of the cam means.

Figure 7:
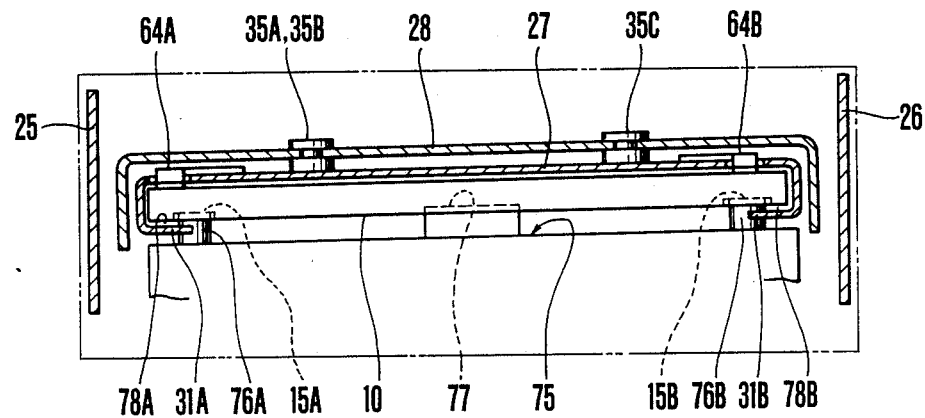
FIG. 7 is a sectional view showing a cassette loading state.

FIG. 7 shows the cassette is in a set, that is, loading state.

In FIG. 1, when the cassette 10 is locked to the loading position with the shutter 17 in open state, a recording and reproducing head 100 is inserted into the cassette 10 (FIGS. 1, 4, 5) through the open portion 16 (FIGS. 10, 13) of the cassette 10, to record information (writing in) or read out while making linear motion (head shifting) in the forward and backward motions from the open portion 16.

In FIGS. 1 and 7, on the base 75, pins 76A, 76B, 101A, 101B for positioning the cassette 10 (shells 11A and 11B) and a rotating spindle 77 are installed for driving and positioning (height and plan position, parallelism) the floppy disc 12 which is driven by a motor not shown.

In the structure of the example shown, positioning of the cassette 10 in the directions of x and y (right and left, forward and backward) is performed by two pieces of pins 76A and 76B. Positioning of the cassette 10 in the direction of z (in the direction of thickness of the floppy disc 12) is all performed by four pieces of pins 76A, 76B, 101A and 101B.

When the cassette 10 is pressed and lowered to the head 100 and the spindle 77 by the movement of the loading plates 50 and 51, concave portions 15A, 15B, 15C and 15D of the cassette 10 (FIG. 13) come to abut against the pins 76A, 76B, 101A and 101B, and at the same time, the hub 13 of the disc 12 (FIG. 13) comes to abut against the rotating spindle 77 to effect positioning of the cassette 10.

Specifically, exact positioning of the disc 12 for writing in and reproducing is required in relation with the head 100. Therefore, for example, the rotating spindle 77 and the hub 13 should be magnetic suction types and engaging structures capable of exactly controlling parallelism, aligning and rotation position to prevent eccentricity.

The cassette holder 27 and the slide member 28 are pulled down a little further than the cassette 10 by the engaging cams 60A, 60B and 61A, 61B of the loading plates 50A and 50B. When loading is completed, there will be gaps 78A and 78B between the guide portions 31A, 31B and the cassette 10. When in the loading state, the cassette 10 is pressed downward by the leaf spring 64A and 64B. Therefore, the cassette 10 is elastically positioned by a prescribed retention force without any influence of the cassette holder 27.

On the other hand, in FIG. 1 and FIG. 4, a lock and release mechanism 80 is installed between the right side plate 26 and the right loading plate 51 for locking the cassette 10 in the loading position (FIG. 7) by the closing movement of the door 48, releasing the locked state of the cassette 10 by the pressing movement of the door 48 again, and returning (ejecting) the cassette 10 to the ejection position by the force of return springs 62A and 62B of the loading plates 50 and 51.

Figure 11:
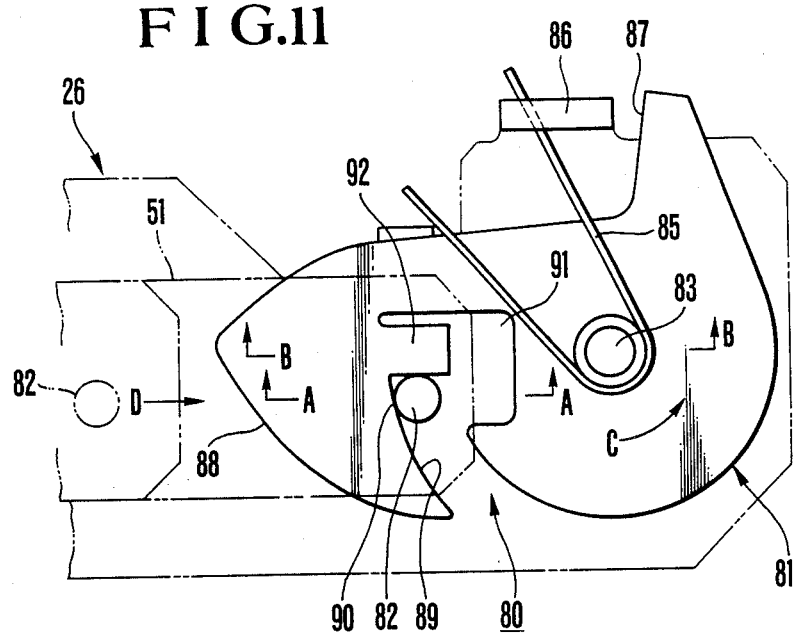
FIG. 11 is a partial front view of the lock and release mechanism of the cassette loading apparatus of FIG. 1.
Figure 12A:
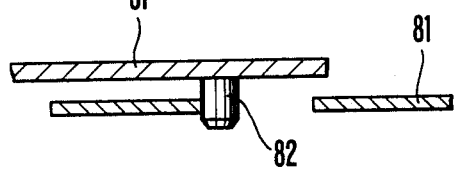
FIGS. 12(A) and 12(B) are partial sectional views taken along lines A—A, and B—B respectively of FIG. 11.
Figure 12B:
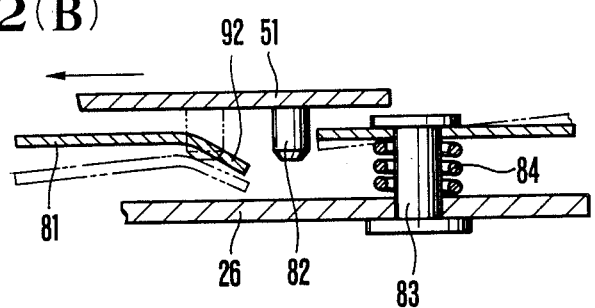

FIGS. 11, 12(A) and 12(B) are a front view and sectional views (line A—A, line B—B) showing in details the lock and release mechanism 80.

In FIGS. 1, 4, 11, 12(A) and 12(B), a lock plate 81 is axially supported to the right side plate 26. An engaging pin 82 is planted on the right side loading plate 51 for locking and releasing in conjunction with the lock plate 81.

In FIGS. 11 and 12(A) and 12(B), the lock plate 81 is installed rotatably and slantly in the axial direction or displaceably against a pin 83 planted on the right side plate 26. In an example shown in the figure, the lock plate 81 is urged to move to the end side of the pin 83 through a coil spring 84 locked in the pin 81.

The lock plate 81 is urged to move by a spring 85 in the direction shown by Arrow C in FIG. 11. And when the engaging pin 82 is not in contact, it is in the initial rotation position, wherein a projection 87 abuts against a stopper 86 installed on the side plate 26.

As shown in FIGS. 11, 12(A) and 12(B), the lock plate 81 is formed by plate members. In the lock plate 81, are formed a cam portion 88, wherein an engaging pin 82 of the loading plate 51 making parallel movement in the direction of Arrow D makes initial contact and slides by pressing against a spring 85, a guide groove 89, a hooking portion 90, wherein the lock plate and the pin 82 become to be in stable conditions, a release starting portion 91, wherein the pin 82 comes into by the second pressing, and a release guide portion 92, wherein the pin 82 slanted in the direction shown in FIG. 12(B) is surmountably formed.

The operation of the lock and release mechanism 80 is as follows:

When the door 48 begins to close after the cassette 10 is chucked, the loading plate 51 and the engaging pin 82 planted thereon move in parallel in the direction of Arrow D.

When the cassette 10 is pressed inwardly for a certain distance, the engaging pin 82 contacts with the cam portion 88 of the lock plate 81 and then the lock plate 81 rotates in the clockwise direction (FIG. 11) against the spring 85 by the upward force component (in FIG. 11).

When the engaging pin 82 moves further to reach the entrance of the guide groove 89 after passing through the cam portion 88, the lock plate 81 is rotated in the counterclockwise direction by the force of the spring 85. And the engaging pin 82 is hooked at the lock position 90. There, closing action of the door 48 is finished.

Being in a stable lock condition at this position, the loading plate 51 urged to move in the direction of entrance (to left direction in FIG. 11) by a return spring 62B (FIG. 4) and the lock plate 81 urged to move in the counterclockwise direction of FIG. 11 by the spring 85 are engaged and held in stable conditions.

The lock position corresponds with the cassette setting position shown in FIG. 7.

Now, an explanation will be given to actions for taking out the cassette 10.

When taking out the cassette 10, only pressing operation further in the pressing direction (the second pressing) of the door 48 in the closed direction is adequate.

When the closed door 48 (FIG. 4) is pressed, in FIGS. 11 and 12(A), the loading plate 51 is pushed into the inner part for a certain distance against the spring 62B and the engaging pin 82 is unlocked from the lock position 90 to slightly move to the inner part.

When the engaging pin 82 is unlocked from the lock position 90, the lock plate 81 is rotated slightly in the counterclockwise direction by the spring 85 and the engaging pin 82 reaches a release starting portion 91.

When the engaging pin 82 reaches the release starting portion 91, the engaging pin 82 of the loading plate 51 urged to move to the entrance direction (the direction of opening door 48) comes to contact with the release guide portion 92.

However, as shown in FIG. 12(B), the release guide portion 92 is in the slanting position higher than that of a contacting portion of the engaging pin 82. Moreover, as shown by the two-dot chain line in FIG. 12(B), the lock plate 81 itself is displaceably held in the axial direction of an axial supporting pin 83. Therefore, the engaging pin 82 is able to easily run over the release guide portion 92 by the spring force of the spring 62B. Loading plates 50 and 51 on both sides are returned immediately to the ejection position (an almost same position as the chucking position when the cassette 10 is inserted as described above) by the spring force of return springs 62A and 62B on both sides.

In short, the cassette 10 locked in the loading position is released to immediately return to an extractable ejection position when the door 48 is merely pushed.

When the door 48 is pushed further from the closing position, locking of the closing position and releasing thereof are accomplished. Therefore, the door 48, that is, the loading plates 50 and 51 are movably structured to go further to the inner side from the closing position. Therefore, guide grooves 55A and 55B of the loading plates 50 and 51 are formed longer in length of stroke required for locking and unlocking from the closing position.

In this case, retracting and ejecting of the cassette 10 are made in a condition that cassette holding claw 42 of the chuck link 43 is pressably engaged with the concave portion 14 of the cassette 10 by the spring force of predetermined amounts while being axially supported by the slide member 28.

Therefore, as described above, even when the lock is released and the cassette 10 is returned to the ejection position by spring force, the cassette holding claw 42 is prevented exactly from unlocking by acceleration and deceleration actions or impact of the cassette concave portion 14.

Accordingly, the cassette 10 is prevented from ejecting to fall down through the open portion when the cassette is ejected.

An embodiment of the present invention is explained as applied to a loading apparatus of a floppy disc in accordance with drawings, but the present invention is applicable to various kinds of cassette loading apparatuses wherein cassettes such as a video tape cassette, a CD cassette, an audio cassette are set in a drive apparatus (mechanism). According to the present invention, a cassette is extracted in the loading position to lock by the movement of closing a door and the cassette is released to return to the ejection position by pressing the door again. Therefore, a front panel is easily made flat-nosed. Improvement in designs and effect of space reductions are attainable, and that, inserting and extracting of the cassette is possible with single touching of this cassette loading apparatus.

As "a means for pressing by elastic means the cassette 10 against the cassette holder 27 to hold" and "a means for pressing the cassette 10 against seating surfaces (76A, 76B, 101A, 101B) by the elastic means at a cassette loading position" in the embodiment of the present invention described above, plate springs 64A and 64B installed on both sides of the upper surface of the cassette holder 27 are used, but instead of these, elastic means corresponding with the plate springs 64A and 64B may be formed into one unified body with the cassette holder 27 by utilizing elasticity of the cassette holder 27 itself to form part thereof into a configuration having suitable spring characteristic.

Moreover, instead of plate springs (elastic means) 64A and 64B installed on both sides of the upper surface of the cassette holder 27, an elastic means consisting of links 113 and 113' pivotally supported respectively by rotation supporting points 112 and 112' on the cassette holder 27 and a spring 114 urging to move each of the links 113 and 113' to the direction of contact by pressing may be utilized. And in this way, a cassette loading apparatus excellent in durability and reliability will be available, because the cassette is exactly retracted into a loading position without any impact, and returned exactly to ejection position, and the cassette or the head is protected from impact by pressing the cassette against the cassette holder to is held by an elastic means. The cassette holder is retracted into the loading position by a guide mechanism, and at the loading position, positioning is effected by pressing the cassette against a seating surface on the fixing side by the elastic means.

What is claimed is:

1. A cassette loading apparatus comprising:
   (A) housing means for defining an opening for inserting a cassette from the outside of said apparatus;
   (B) holder means for receiving and holding said cassette inserted in said apparatus through said opening at a first position opposite to said opening and for moving said cassette from said first position to a second position at which said cassette is loaded at a predetermined loading position in said apparatus;
   (C) a lid supported by said housing means for movement to open and close said opening;
   (D) control means for connecting said lid to said holder means to move said holder means from said first position to said second position by closing said lid and to move said holder means from said second position to said first position by opening said lid; and
   (E) lock means for locking said lid in a closed state by a closing action of said lid and for releasing the lock of said closed state by pressing said lid in the closing direction in said closed state.

2. An apparatus according to claim 1, wherein said lid is supported by said housing means to be flush with a surface of said housing means in which said opening is formed in a state of being locked in said closed state.

3. An apparatus according to claim 1, wherein said control means includes a slide member moving in accordance with the opening and closing actions of said lid, said slide member having cam means for moving said holder means to said first and second positions in accordance with a slide action thereof.

4. An apparatus according to claim 3, wherein said slide member is supported in said housing means to slidably move with said lid to a predetermined position in the closing direction of said lid after said holder means reaches said second position, and to activate by the slide action said lock means to lock the closed state of said lid and said holder means at said second position of said holder means.

5. An apparatus according to claim 4, wherein said lock means is a mechanism of repeating lock and unlock actions each time said slide member slides to said predetermined position and alternately repeating the lock state and the unlock state, depending upon the movement of said lid in the closing direction.

6. An apparatus according to claim 5, further comprising:
   a cassette ejection mechanism connected to said holder means to eject the cassette outwardly from said opening when said holder means is moved to said first position from said second position.

7. An apparatus according to claim 1 or claim 6, wherein said holder means receives and holds the cassette inserted through said opening and loads the cassette by lowering horizontally to said second position according to the closing action of said lid.

8. An apparatus according to claim 7, further comprising:
pick-up means for gaining access to a recording medium in the cassette contained in said holder means in a condition of said holder means being moved to said second position; and
driving means coupled with said recording medium for driving said recording medium.

9. An apparatus according to claim 8, wherein said recording medium is a magnetic disc and said pick-up means is a magnetic head.

10. An apparatus for recording or reproducing a signal on or from a recording medium, comprising:
(A) housing means for defining an opening for inserting the recording medium from the outside of said apparatus;
(B) holder means for receiving and holding said recording medium inserted in said apparatus through said opening at a first position opposite to said opening, and for moving from said first position to a second position at which said recording medium is loaded at a predetermined loading position in said apparatus, said holder means moving between said first and second position in parallel;
(C) a lid supported by said housing means at said opening to open and close said opening, for moving said holder means from said first position to said second position or vice versa by a closing action thereof and for moving said holder means from said second position to said first position by an opening action thereof;
(D) head means for recording or reproducing signals on or from the recording medium in a condition of said holder means being moved to said second position; and
(E) lock means for locking said holder means to said second position and for repeatedly locking and unlocking each time said lid is pressed in the closing direction of said lid.

11. An apparatus according to claim 10, wherein said lid is movable further to a predetermined position in the closing direction from said second position of closing of said holder means, and said lock means repeats locking and unlocking each time said lid is moved to said predetermined position.

12. An apparatus according to claim 10, further comprising:
a loading plate for connecting said lid and said holder means, said loading plate controlling said holder means to move to said first position or said second position in accordance with opening and closing actions of said lid.

13. An apparatus according to claim 12, wherein said lock means engages said loading plate to lock said loading plate.

14. An apparatus according to claim 13, wherein said loading plate has a cam groove movable in association with opening and closing actions of said lid for moving said holder means up and downwardly between said first position and second position.

15. An apparatus according to claim 10, wherein said lid is supported by said housing means when said lid is in said closed state to be flush with a front panel of said housing means in which said opening is formed.

16. An apparatus according to claim 10, wherein said recording medium is a magnetic disc.

17. An apparatus according to claim 16, wherein said head means is a magnetic head.

18. An apparatus for recording or reproducing a signal on or from a disc-shaped recording medium contained in a cassette having a slot for exposing the recording medium and a shutter member for opening and closing said slot comprising:
(A) housing means for defining an opening for inserting said cassette from the outside of said apparatus;
(B) holder means movable between a first position in which the cassette inserted through said opening is receivable and a second position in which the received cassette is loaded to a predetermined loading position in said apparatus;
(C) a head supported in said apparatus to gain access to the recording medium through said slot of the loaded cassette in said loading position;
(D) shutter opening means for opening said shutter member of the cassette in accordance with an action of said cassette being inserted through said opening for insertion and being received within said holder means;
(E) a lid supported by said housing means at said opening to open and close said opening and connected to said holder means, for moving said holder means from said first position to said second position in accordance with a closing action of said lid, and from said second position to said first position in accordance with an opening action of said lid; and
(F) lock means for repeatedly locking and unlocking said lid each time said lid is moved to a predetermined position in the direction of closing said lid.

19. An apparatus according to claim 18, further comprising:
a loading plate for connecting said lid and said holder means, said loading plate controlling said holder means to move to said first position or said second position in accordance with opening and closing actions of said lid.

20. An apparatus according to claim 19, wherein said lock means engages said loading plate to lock said loading plate.

21. An apparatus according to claim 20, wherein said loading plate has a cam groove movable in association with opening and closing actions of said lid for moving said holder means up and downwardly between said first position and second position.

22. An apparatus according to claim 21, wherein said lid is supported by said housing means when said lid is in said closed state to be flush with a front panel of said housing means in which said opening is formed.

23. An apparatus according to claim 22, further comprising:
a cassette ejection mechanism installed to said holder means to eject the cassette outwardly from said opening when said holder means is at said first position.

24. An apparatus according to claim 18 or claim 23, wherein said head is a magnetic head.

* * * * *